Feb. 7, 1950     W. KELLGREN ET AL     2,496,349

LINER FOR ADHERENT RUBBER SURFACES AND THE LIKE

Filed Sept. 26, 1945

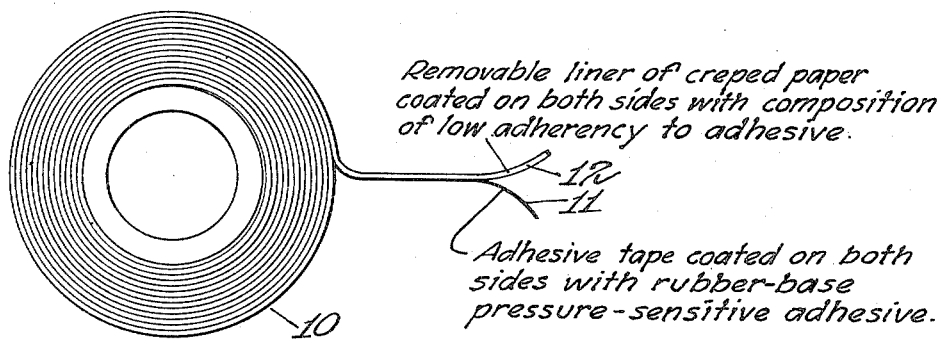

Fig. 1

Removable liner of creped paper coated on both sides with composition of low adherency to adhesive.

Adhesive tape coated on both sides with rubber-base pressure-sensitive adhesive.

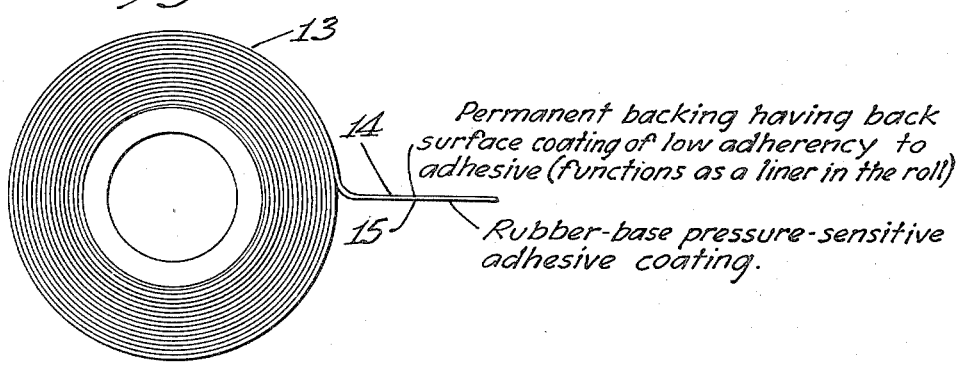

Fig. 2

Permanent backing having back surface coating of low adherency to adhesive (functions as a liner in the roll)

Rubber-base pressure-sensitive adhesive coating.

Inventors
Waldo Kellgren
Jesse J. Carpentier
By Carpenter, Abbott, Coulter & Kinney
Attorneys Patented Feb. 7, 1950

2,496,349

UNITED STATES PATENT OFFICE 2,496,349

LINER FOR ADHERENT RUBBER SURFACES AND THE LIKE

Waldo Kellgren and Jesse J. Charpentier, St. Paul, Minn., assignors to Minnesota Mining & Manufacturing Company, St. Paul, Minn., a corporation of Delaware Application September 26, 1945, Serial No. 618,704

6 Claims. (Cl. 117—155)

This invention aims to provide an improved liner for adhesive tapes and for adherent rubber surfaces generally.

Milled rubber, and rubber compounded with tack-producing materials (such as resins or softeners), has an adherent surface which causes sheets or coatings thereof to adhere or cohere when brought together. It is often desired to roll or stack such sheets, or sheet material having similar rubber coatings, and where this would result in a sticking or bonding together of rubber surfaces thus brought into mutual contact, a liner may be employed as a temporary protective covering, serving to separate the surfaces.

Adhesive tapes of the pressure-sensitive (tacky) type often require such a liner. Thus bandages and corn plasters, comprised of a strip of adhesive tape having uncovered surface portions, may employ a liner to cover the exposed adhesive. This serves not only to prevent such articles from sticking together but to facilitate handling and to protect against dirtying and contamination.

Pressure-sensitive adhesive tapes of the double-coated type are employed for many purposes. These tapes have a backing which is coated on both sides with adhesive. A removable liner must be used in order that such adhesive tape may be wound into rolls, as otherwise the adjacent turns would bond together and unwinding would be made difficult or impossible (see, for example, the tape described in the United States patent to Kellgren, No. 2,206,899, issued July 9, 1940).

Even in the case of adhesive tape of the ordinary kind, it is desirable when such tape is wound upon itself in roll form, that the back surface of the backing adhere to a limited degree to the contacting adhesive surface in order to facilitate ready unwinding. In such a roll, the backing functions not only as a permanent base for the adhesive coating but also as a temporary liner since, in the latter connection, the backing in each turn of the roll temporarily covers the adhesive surface of the overlying turn.

In accordance with this invention the liner bears a coating (which may or may not also penetrate through or impregnate the body of the liner) of a composition which we have found to be remarkably effective in accomplishing the desired results. This composition greatly reduces the adherence of tacky rubber surfaces, thereby facilitating removal.

The accompanying drawings illustrate the invention as embodied in rolls of pressure-sensitive adhesive tape which are shown in diagrammatic side views.

Fig. 1 shows a tape roll 10 formed of an adhesive tape 11 which is coated on both sides with a rubber-base pressure-sensitive adhesive, and laminated to a removable liner 12 of creped paper coated on both sides with a composition which has a low adherency to the pressure-sensitive adhesive. The liner is thus interwound with the adhesive tape, and the latter is located in the roll between turns of the liner which prevents adjacent turns of the adhesive tape from bonding together. The tape and liner are wound in so that the liner is on the outside. When drawn from the roll, the liner can be readily separated from the tacky tape due to the low adherency; and unwinding is likewise facilitated by the low adherency.

Fig. 2 shows a roll 13 of pressure-sensitive adhesive tape wound directly upon itself. The adhesive tape has a permanent backing 14 having a back surface coating of low adherency to the pressure-sensitive adhesive, and is coated on the inside with a rubber-base pressure-sensitive adhesive coating 15. The backing may, for example, be a creped paper which is coated on the back with the composition of low adherency. The backing serves the dual use of a base for the tacky adhesive and a liner for facilitating unwinding of the tape from the roll.

The liner surface is preferably rugose or uneven, rather than flat and smooth, in order to present a limited area of contact, thereby further reducing the adhesion and facilitating removal. Creped paper has been found quite useful. An open mesh cloth, such as crinoline, also serves to provide such a surface. Such a surface, sized or coated with the composition of this invention, not only permits of ready removal of the liner from tacky rubber surfaces, but the liner may remain in contact with pressure-sensitive rubber base adhesive surfaces for long periods without adversely affecting the adhesive or its adhesive power. This latter desirable property is of particular importance in the case of liners employed in rolls of pressure-sensitive adhesive tape. Such tape is frequently not used until some months after it is made and it is important that its adhesive properties remain substantially the same. Furthermore, the coating on the liner remains substantially unaffected and does not pull off when the tape is removed from the liner, and the liner can be repeatedly reused if desired.

Another important feature is that the effectiveness of the liner and its desirable characteristics are not lost when subjected to the extremes of cold and hot weather, and high and low humidities, which are often encountered in various parts of the country. For example, rolls of tape may be subjected to temperatures well over 100° F. for considerable periods while being stored in warehouses.

The low adhering liner composition which we have discovered to be so satisfactory is essentially comprised of polyvinyl butyral, a lesser proportion of hydrogenated castor oil wax at least equal to about one-half the polyvinyl butyral, a still lesser proportion of higher fatty acid when desired (an optional component), and an antioxidant, all combined in a homogeneous non-bleeding blend. This may be conveniently applied to the liner in solution form followed by heating to drive off the solvent and produce a continuous homogeneous film.

Polyvinyl butyral is commonly prepared by the reaction of butyraldehyde with hydrolyzed polyvinyl acetate, and is exemplified by such commercially available products as "Butvar" (made by Shawinigan Chemicals Ltd.), "Butacite" (made by E. I. du Pont de Nemours Co., Inc.), and "Vinylite XYSG" (made by Carbide and Carbon Chemicals Corp'n). "Butacite VF-7100," a commonly used polymer, is found to be highly effective. This material is a polyvinyl butyral having a softening point of 62° C. and having a relatively low hydroxyl value. It contains less than 1% of residual acetate groups, is soluble in toluene, and compatible with hydrogenated castor oil wax even in the absence of higher fatty acids. Other species of polyvinyl butyrals may be used. An increase in hydroxyl value, i. e. a displacement toward unreacted polyvinyl alcohol, somewhat reduces the solubility of the polymer in aromatic solvents, and may also reduce its compatibility with the wax or other components of the liner composition.

Various other simple or mixed acetals of polyvinyl alcohol or of partially hydrolyzed polyvinyl acetate which are suitably compatible and soluble, may be substituted in our composition with good results, and are equivalent to polyvinyl butyral.

The hydrogenated castor oil wax is exemplified by Opal Wax No. 10, having a melting point of about 180° F., sold by E. I. du Pont de Nemours & Co. Inc.

The higher fatty acid is exemplified by stearic acid, oleic acid, lauric acid and the like.

An antioxidant is employed to serve as an anti-embrittling agent in order to prevent the gradual development of stiffness or harshness in the liner, particularly during storage at moderately elevated temperatures. The following antioxidants, which are commonly used in the rubber industry, are examples which are highly effective for this purpose: beta-naphthol, hydroquinone, "Solux" (para-hydroxy-phenyl-morpholine), "Flectol H" (a condensation product of acetone and aniline), and "Neozone D" (phenyl-beta-naphthylamine).

*Example*

| | Parts by weight |
|---|---|
| Polyvinyl butyral (such as Butacite VF-7100) | 562.5 |
| Hydrogenated castor oil wax | 365 |
| Stearic acid (triple pressed) | 56.2 |
| p-Hydroxy-phenyl-morpholine (antioxidant) | 11.2 |
| Carbon black (may be omitted) | 2.8 |
| Aromatic hydrocarbon solvent | 1575 |
| N-butanol | 787 |

The components may be conveniently combined in an internal mixer of the type well known in the rubber industry, such as a Werner-Pfleiderer mixer, which is provided with a steam jacket for heating.

The mixer is pre-heated with 20 lb. steam in the jacket and the wax and stearic acid dumped in, followed by mixing until they are completely melted together. The polyvinyl butyral is then slowly added within about 15 minutes, and allowed to mix for not more than about one-half hour. The p-hydroxy-phenyl-morpholine, together with the carbon black or other desired coloring agent (if used), is then added in small portions, and mixing is continued for about 1½ hours or until the mass is homogeneous. The batch is then cooled to below the boiling point of the solvents used, by replacing the steam in the mixer jacket with cold water and, where desired, by the addition of "dry ice" (solid carbon dioxide) to the batch itself. The solvents are then added and mixing continued until solution is effected.

Pure aromatic solvents such as toluol or xylol may be used in the above formula if desired, but petroleum solvents containing a high proportion of aromatics, such as Hydrosolvent No. 2 or Amsco-Solv B, are equally satisfactory. In place of n-butanol, tert-butanol has been used, and other of the higher alcohols having proper evaporation rate and solubility characteristics may also be substituted.

An alternative but somewhat less rapid procedure for the compounding of our novel compositions involves simple churn mixing of the various solid and liquid ingredients; or the solid materials may first be blended in an internal mixer at an elevated temperature, and the blend subsequently dissolved in the mixed solvent in a churn or paddle type mixer. Prolonged heating of the dry composition, even at temperatures of the order of 150° F., e. g., during the mixing or blending operations, is permissible only in the presence of the antioxidant, since the material otherwise becomes brittle and may even become crumbly and incapable of forming a continuous film when applied to a paper base sheet.

A liner which has been found quite useful in making up rolls of double-coated pressure-sensitive adhesive tape may be made as follows: A web of 35# per ream bibulous kraft crepe paper is impregnated with the foregoing solution in amount which will leave about 6–7 grains of impregnant solids per 24 sq. in., the temperature of the saturating solution being about 135–140° F., and is then passed through a tunnel dryer where the temperature to which it is subjected increases from about 180° F. to about 210° F. The rate of travel is adjusted so that the solvents are removed and a continuous film of the impregnant is formed on the surfaces. This hot drying direct from a true solution results in a continuous homogeneous film even though the temperature used is below the fusion temperature of the dried product. If the initial drying were at such a low temperature as to form a gel, it would then be necessary to heat the impregnated paper to about 250° F. in order to form a homogeneous film by fusion. In either case, the film may be designated as homogeneous; the necessary temperature required for obtaining it depending upon the technique.

In this case the liner has been coated on both sides, since both sides are contacted by pressure-sensitive adhesive when it is wound into a roll of double-coated adhesive tape. The impregnant composition also serves to unify and strengthen the paper.

Where only one side of the liner is to be used for covering an adherent rubber surface, the solution may be applied to that side without necessarily saturating or penetrating the entire thickness. Where the paper is to serve as a backing for adhesive tape, the adhesive may be coated upon the reverse side, the treated paper then playing the dual role of a base for the adhesive and a liner for facilitating unwinding of the tape from a roll thereof.

The liner is not limited to use in connection with adherent rubber surfaces wherein natural rubber is employed, as it has been found effective for use where the tacky layer or adhesive is comprised of a rubber substitute or synthetic rubber, such as, for example, where the tacky adhesive is a blend of rubbery isobutylene elastomer and rosin, or of rubbery butadiene-styrene copolymer and a terpene resin.

The proportions of the various ingredients of our improved liner composition may be varied within reasonably wide limits, depending on the specific materials used and on the results desired. In the formula, two parts of the antioxidant have been added per 100 parts of polyvinyl butyral; but where a somewhat less effective anti-embrittling agent such as beta-naphthol is used, this amount is preferably increased, for example to 4 parts. The ratio of higher fatty acid to hydrogenated castor oil wax in the formula is 10 to 65 (to 100 of polyvinyl butyral); but this ratio, as well as the ratio of wax to polymer, may be changed depending on the effect desired. It has been found that increase in the stearic acid content, for example, provides a somewhat softer and more flexible sheet, and somewhat easier removal of adhesive tapes affixed thereto; but at the same time, there is a tendency for the adhesive mass to become slightly less tacky on long contact with the liner surface, presumably due to bleeding or migration of some of the acid to the surface in contact with the adhesive. The proportion of stearic acid in the formula of the example would rarely if ever, therefore, be increased to much above about 25 parts per 100 parts of polyvinyl butyral in order to provide a non-bleeding liner. In such a formula, the proportion of wax would preferably be reduced to about 50 parts per 100 parts of polyvinyl butyral.

To illustrate the effectiveness of our liner in reducing the force required for stripping adhesive tape therefrom, the following experimental data is cited. A comparison is made with paper sized with shellac and with holland cloth (a starch-filled fabric which is widely used as a liner), and the force required to strip the adhesive tape from a glass and from a polished metal surface is also given to provide a standard of comparison. Both 35 lb. and 55 lb. crepe paper liners were prepared from our polyvinyl butyral-Opalwax No. 10-stearic acid-"Solux" compositions, in the following proportions respectively.

| Paper | Proportion of ingredients |
|---|---|
| 35 lb | 100-50-25-2 |
| 55 lb | 100-65-10-2 |

The tapes used for the tests included commercial pressure-sensitive masking tapes with a firm reclaim rubber base adhesive and with a softer synthetic rubber base adhesive, both of aggressively tacky nature. One inch strips of the adhesive tape were pressed in firm contact with the various test liner surfaces, using a steel roller to secure uniform results. The test lots were allowed to stand for twenty-four hours under room conditions and the stripping forces measured.

The stripping force was measured by placing the sample with its back secured to a driven platform which can be moved at a constant rate through a worm drive coupled to an electric motor. The end of the adhesive tape was peeled back and connected to a device for measuring tension, such that the tape was pulled back at a 180° angle when the platform was driven. In making the test, the platform was driven at the constant rate of 7½ feet per minute, causing the tape to be stripped from the liner surface with the removal force being indicated by the tension, measured in ounces. The following results were obtained:

| Liner | Stripping Force | |
|---|---|---|
| | firm adhesive | soft adhesive |
| 55 lb. liner (this invention) | 3 | 12 |
| 35 lb. liner (this invention) | 2 | 4 |
| Shellac coated crepe paper | 26 | 22 |
| Holland cloth | 26 | 26 |
| glass | 46 | 46 |
| steel | 48 | 44 |

The value of the present liner has also been thoroughly demonstrated under the conditions of actual commercial use.

A double-coated fibrous base pressure-sensitive adhesive tape comprising a thin porous paper with a coating on each surface of an aggressively tacky rubber-resin adhesive was wound into roll form with a liner prepared from 35 lb. creped paper coated on both surfaces with the composition of the example to provide a roll of adhesive tape as shown in Figure 1. Even after storage at quite high temperatures, of the order of 120-150° F., the tape was found to be readily removable from the roll and from the liner, and was found to retain its original aggressive tackiness substantially fully as well as in prolonged contact with glass on other inert surface. The liner retained its original degree of flexibility, and the surface film remained flexible, tough, and well bonded to the crepe paper. Similarly desirable results were obtained when using a liner prepared from 55 lb. creped paper coated with a similar composition having a slightly increased proportion of stearic acid, in connection with a double-coated pressure-sensitive cloth tape having a synthetic rubber-resin adhesive.

To illustrate the effectiveness of the antioxidant in these compositions, films were prepared both with and without a small percentage of rubber antioxidant, and were held in an oven at 150° F. After one month, the film containing no antioxidant was found to be extremely brittle and could be removed in dry form from the glass supporting member only by scraping; but the film containing the antioxidant, with or without stearic acid, remained tough and fully flexible.

What we claim is as follows:

1. For use as a temporary covering for adherent rubber surfaces, a creped paper having a low adherency surface coating essentially comprised of polyvinyl butyral, a lesser proportion of hydrogenated castor oil wax at least equal to about one-half the polyvinyl butyral, a still lesser proportion of higher fatty acid, and, as an anti-embrittling agent, an organic antioxidant for rubber forming a homogeneous non-bleeding film blend.

2. A liner comprising a creped paper coated and impregnated with a low adherency homogeneous non-bleeding blend formed of polyvinyl butyral combined with a lesser proportion of hydrogenated castor oil wax at least equal to about one-half the polyvinyl butyral, a still lesser proportion of higher fatty acid, and, as anti-embrittling agent, an organic antioxidant for rubber.

3. In a roll of double-coated pressure-sensitive adhesive tape, an interwound liner of creped paper impregnated and coated on both sides with a low adherency homogeneous non-bleeding composition essentially comprised of polyvinyl butyral, a lesser proportion of hydrogenated castor oil wax at least equal to about one-half the polyvinyl butyral, a still lesser proportion of higher fatty acid, and, as an anti-embrittling agent, an organic antioxidant for rubber.

4. In a roll of pressure-sensitive adhesive tape which is tacky on both sides, an interwound liner of creped paper filmed on both sides with a homogeneous non-bleeding composition essentially comprised of polyvinyl butyral, hydrogenated castor oil wax, higher fatty acid, and an organic rubber antioxidant in the approximate ratio of 100 to 65 to 10 to 2, respectively.

5. A pressure-sensitive adhesive tape wound upon itself in roll form, comprising a creped paper backing coated on the inside surface with a tacky pressure-sensitive adhesive and coated on the back surface with a low adherency homogeneous non-bleeding composition essentially comprised of polyvinyl butyral, a lesser proportion of hydrogenated castor oil wax at least equal to about one-half the polyvinyl butyral, a still lesser proportion of higher fatty acid, and, as an anti-embrittling agent, an organic antioxidant for rubber.

6. A pressure-sensitive adhesive tape according to claim 5 wherein said polyvinyl butyral, hydrogenated castor oil wax, higher fatty acid, and an organic rubber antioxidant, are mutually proportioned in the approximate ratio of 100 to 65 to 10 to 2, respectively.

WALDO KELLGREN.
JESSE J. CHARPENTIER.

REFERENCES CITED

The following references are of record in the file of this patent:

UNITED STATES PATENTS

| Number | Name | Date |
|---|---|---|
| 2,217,163 | Fletcher | Oct. 8, 1940 |
| 2,268,121 | Kingsley | Dec. 30, 1941 |
| 2,392,639 | Brinker | Jan. 8, 1946 |
| 2,395,668 | Kellgren et al. | Feb. 26, 1946 |
| 2,396,098 | Haas | Mar. 5, 1946 |
| 2,422,259 | Pratt | Jan. 17, 1947 |